United States Patent

Speakman et al.

[19]

[11] Patent Number: 4,789,552

[45] Date of Patent: Dec. 6, 1988

[54] FROZEN EDIBLE PRODUCT AND METHOD FOR MAKING THE SAME

[76] Inventors: David Speakman, 3755 Mary Cliff La., Brookfield, Wis. 53005; Robert L. Macy, Jr., 6426 Upper Parkway North, Wauwatosa, Wis. 53213

[21] Appl. No.: 48,456

[22] Filed: May 7, 1987

Related U.S. Application Data

[63] Continuation of Ser. No. 708,677, Mar. 6, 1985, abandoned.

[51] Int. Cl.[4] .................... A23G 9/00; B65B 29/08; B65D 85/78
[52] U.S. Cl. .................... 426/107; 426/101; 426/234; 426/241; 426/282
[58] Field of Search .................... 426/95, 94, 100, 101, 426/107, 139, 234, 241, 243, 279, 280, 282

[56] References Cited

U.S. PATENT DOCUMENTS

| | | |
|---|---|---|
| 1,445,187 | 2/1923 | Vaughn . |
| 1,511,878 | 10/1924 | Gargay . |
| 1,947,972 | 2/1934 | Nolte . |
| 1,968,732 | 7/1934 | Anagnos ............................ 426/95 |
| 2,005,245 | 6/1935 | Stover . |
| 2,486,194 | 10/1949 | Moser ............................ 426/101 |
| 2,600,566 | 6/1952 | Moffett ............................ 426/234 |
| 3,404,177 | 7/1946 | Jetschmann . |
| 3,770,460 | 11/1973 | Vroman ............................ 426/279 |
| 4,020,188 | 4/1977 | Forkner . |
| 4,233,325 | 11/1980 | Slangan et al. ............................ 426/234 |

FOREIGN PATENT DOCUMENTS

| | | |
|---|---|---|
| 848133 | 10/1939 | France . |
| 1017480 | 1/1966 | United Kingdom . |

*Primary Examiner*—George Yeung
*Attorney, Agent, or Firm*—Kenyon & Kenyon

[57] ABSTRACT

A method of manufacturing a frozen edible composition combining a frozen core surrounded by and in contact with a frozen coating, wherein the composition can be exposed to microwave energy, in its entirety, so that the frozen coating becomes heated to a softened state while the core remains substantially frozen.

6 Claims, 1 Drawing Sheet

FROZEN EDIBLE PRODUCT AND METHOD FOR MAKING THE SAME

This application is a continuation of application Ser. No. 708,677, filed Mar. 6, 1985, now abandoned.

BACKGROUND OF THE INVENTION

This invention relates to a composition for edible comestibles such as ice cream, custard, yogurt, pudding, ices and the like. More specifically, the invention relates to a frozen dessert made with frozen ice cream, frozen custard, frozen yogurt, frozen pudding, frozen ices and the like combined with a topping or coating such as chocolate fudge, caramel, strawberry, marshmallow, and the like.

One of the most common examples of the type of edible comestible to which this invention relates is the ice cream sundae topped with chocolate fudge. The chocolate fudge sundae ordinarily combines vanilla ice cream with a chocolate fudge topping or coating.

As well known to any connoisseur of the chocolate fudge sundae, there are generally two ways the sundae is available. The first way is with the chocolate fudge topping or coating heated and poured over the frozen ice cream. The second way is with the chocolate fudge frozen in combination with the ice cream, either as a fudge center or dispersed throughout the ice cream. Many connoisseurs prefer the chocolate fudge heated rather than frozen.

To obtain a sundae with a heated topping, one can either go to an ice cream store or make it from scratch at home. In either case, the sundae is made by placing the frozen ice cream in a container, heating the chocolate fudge topping, and then pouring the hot fudge over the ice cream.

For the individual who makes the sundae from scratch with heated topping, the process requires keeping separate supplies of ice cream and chocolate fudge, usually in quantities greater than what would be required to make a single serving sundae. Further, the process of making the sundae involves the separate time consuming step of heating the fudge topping.

For the retailer supplying sundaes topped with hot fudge, the product requires keeping separate supplies of the basic ingredients and requires significant time and labor to make a sundae with a heated topping. Additionally, the lack of consistent and exact serving portions from sundae to sundae contributes to waste and inventory control problems.

At present, the only alternative to a handmade sundae with a hot topping is a pre-packaged sundae that combines frozen chocolate fudge with the ice cream. Naturally, one cannot heat the fudge in such a combination without melting the ice cream.

The present invention involves a method of making a frozen edible comestible like a fudge sundae that can be subjected to microwave energy in a way that ensures only the fudge melts and heats up while leaving the ice cream substantially frozen.

SUMMARY OF THE INVENTION

Generally, the principal aspect of the invention comprises manufacturing an edible comestible comprising a frozen core surrounded by a frozen coating, the coating having a density generally greater than the frozen core and a thickness between about one quarter to about one half of an inch.

Therefore, it is an object of the present invention to provide a method of formulating a frozen edible comestible with a core surrounded by a coating that upon being exposed to a predetermined amount of microwave energy only the coating melts, while leaving the core substantially frozen.

This and other objects, advantages and features will be more fully set forth in the detailed description which follows.

BRIEF DESCRIPTION OF THE DRAWING

In the detailed description which follows, reference will be made to the drawing comprised of the following figure.

DESCRIPTION OF THE PREFERRED EMBODIMENT

Figure 1:
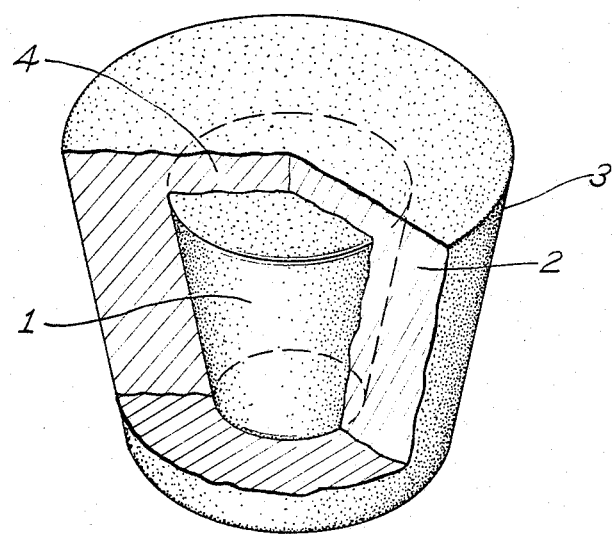
FIG. 1 is a perspective view of the preferred embodiment of the frozen edible comestible of this invention.

Referring to FIG. 1 in the drawing, the edible comestible of this invention comprises a frozen core 1 surrounded by a coating 2. The coating 2 has a density that is generally greater than the frozen core 1 and a thickness between about one quarter to one half of an inch.

To construct the edible comestible of this invention, the coating 2 is spread to a thickness between about one quarter to one half of an inch inside the container 3. The core 1 fills the remaining space in container 3 that has been lined with the coating 2. A top layer of coating 4 is spread to a thickness of between about one quarter to one half of an inch over the top of the core 1. The container is closed with a lid (not shown) and frozen.

The frozen edible comestible of the present invention is constructed in a unique way that enables it to be placed in a microwave oven, exposed to microwave energy for a short period of time, and to produce softened and slightly warm coating 2 and top layer 4, while the core 1 remains substantially frozen and of normal texture. Ice is much more transparent to microwave radiation than liquid water, that is ice absorbs less microwave energy. The dissolved solids levels in the coatings are all greater than the dissolved solid levels in the serum portions of the core materials. The greater the level of dissolved solids, the more the freezing points of the solution is depressed. Therefore, at any given freezing temperature, more ice is present in the core material than in the coating. The water in the coating would be present as a supersaturated solution and not in the form of ice. The inventors believe that because of these circumstances microwave energy is more apt to be absorbed by the liquid water present in the coating, while the microwaves for the most part pass through the ice in the core material. This may be an explanation for why the coating melts while the core remains substantially frozen.

The core 1 of the invention can be made from edible comestibles that can be frozen without detrimental effect such as, ice cream, custard, ice milk, yogurt, flavored ices, and puddings. The coating of the invention can be made from edible comestibles that can also be frozen without detrimental effect such as, but not limited to, chocolate fudge, caramel fudge, strawberry topping, marshmallow topping, and cherries jubilee topping.

It has been found that successful use of the present invention depends at least in part upon the density of the core material 1, and the density of the coating material 2 relative to the core material. The density of the core material 1 ranges between about four to about ten pounds per gallon. The coating material 2 has a density that ranges between about five to about eleven pounds per gallon. Preferably, the core material 1 is made from a substance with high or medium density, such as 20% overrun ice cream with a density of about 7.6 pounds per gallon (high density) or 50% overrun ice cream with a density of about 6.3 pounds per gallon (medium density). Low density substances such as 100% overrun ice milk having a density of about 4.6 pounds per gallon can yield a workable version of the invention, although it is sensitive to microwave energy to the extent that tolerance of overexposure to microwaves is quite limited. Consequently, a core 1 made with substance of high or medium density is preferred. With respect to the coating 2, it may have a density that ranges between about five pounds per gallon to about eleven pounds per gallon. In combining the coating 2 with the core material 1, generally the core material 1 should be less dense that the coating 2. In the case of the coating 2 being a marshmallow topping, the core material 1 may be more dense than the coating 2.

The general formulation of the core 1 of the invention has been previously described. There are, however, numerous specific formulations which are acceptable and the following are examples of such formulations.

FORMULATION A

The core material is made from a premium French vanilla type ice cream with a high butterfat content, high solids content, and frozen with 20% overrun having a density of about 7.6 pounds per gallon. The ice cream is flavored with one half fluid ounce of pure vanilla extract per gallon of formulation. The ingredients by weight percentage for formulation A are:

| Ingredients | Weight Percent |
| --- | --- |
| 36% Cream | 40.972 |
| Sweetened Condensed Skim Milk | 22.203 |
| Sucrose | 6.734 |
| Sugared Egg Yolks | 6.350 |
| Water | 23.741 |

FORMULATION B

The core material is made from a stabilized version of formulation A having about the same density of that formulation. The ingredients by weight percentage for formulation B are:

| Ingredients | Weight Percent |
| --- | --- |
| Formulation A | 99.925 |
| Xanthan Gum | 0.025 |
| Locust Bean Gum | 0.050 |

FORMULATION C

The core material is made from a premium type regular ice cream with a high butterfat content, high solids content, and frozen with 20% overrun having a density of about 7.6 pounds per gallon. The ice cream is flavored with one half fluid ounce of pure vanilla extract per gallon of mix. The ingredients by weight percentage for formulation C are:

| Ingredients | Weight Percent |
| --- | --- |
| 40% Cream | 35.300 |
| Nonfat Dry Skim Milk Powder | 8.380 |
| Sucrose | 14.290 |
| 42 D.E. Corn Syrup | 3.080 |
| Carboxymethyl Cellulose (CMC) | 0.140 |
| Water | 38.810 |

FORMULATION D

The core material is made from a premium type chocolate ice cream with a high butterfat content, high solids content, and frozen with 20% overrun having a density of about 7.6 pounds per gallon. The ingredients by weight percentage for formulation D are:

| Ingredients | Weight Percent |
| --- | --- |
| 36% Cream | 40.083 |
| Sweetened Condensed Skim Milk | 19.040 |
| Sucrose | 7.191 |
| Dutch Process Cocoa | 4.000 |
| Sugared Egg Yolks | 4.432 |
| Water | 25.254 |

FORMULATION E

The core material is made from a commercially available frozen custard mix with 50% overrun having a density of about 6.3 pounds per gallon. The custard has a high butterfat content and a high solids content. The ingredients by weight percentage for formulation E are:

| Ingredients | Weight Percent |
| --- | --- |
| 30% Cream | 32.000 |
| Sweetened Condensed Skim Milk | 30.750 |
| Sucrose | 6.750 |
| Sugared Egg Yolks | 6.40 |
| Water | 23.956 |
| Xanthan Gum | 0.045 |
| Locust Bean Gum | 0.099 |

FORMULATON F

The core material is made from a commercially available soft serve frozen ice milk with 100% overrun having a density of about 4.6 pounds per gallon. The ingredients by weight percentage for formulation F are:

| Ingredients | Weight Percent |
| --- | --- |
| 30% Cream | 11.70 |
| Sweetened Condensed Skim Milk | 14.30 |
| Sucrose | 6.40 |
| Water | 55.35 |
| Xanthan Gum | 0.05 |
| Carboxymethyl Cellulose (CMC) | 0.20 |
| 42 D.E. Corn Syrup | 12.0 |

FORMULATION G

The core material is made by combining a commercially available vanilla pudding with formulation A in amounts where the vanilla pudding is about 37.5 percent by volume of the core material and formulation A is about 62.5 percent by volume of the core material.

Formulation G is frozen with 20% overrun having a density of 7.6 pounds per gallon.

FORMULATION H

The core material is made by combining a commercially available plain yogurt with formulation A in amounts where the yogurt is about 25 percent by volume of the core material and formulation A is about 75% by volume of the core material. Formulation H is frozen with 20% overrun having a density of 6.3 pounds per gallon.

In the following examples, various formulations for the core material are combined with coatings selected from materials such as chocolate fudge, caramel fudge, strawberry topping, marshmallow topping, and cherries jubilee topping. In each of the examples, a Sharp Carousel Microwave Oven, Model R-9330, is used to heat the frozen edible comestible of the invention. The output power of the Sharp microwave oven is 650 W (2000 cc water load) and at a frequency of 2450 MHz. Other commercially available microwave ovens also produce satisfactory results, but time of exposure to microwaves may need to be adjusted.

EXAMPLE I

A coating of chocolate fudge is preferably chilled to a temperature of 40° F., but may be used at room temperature, and spread to a depth of about one quarter of an inch on the inside surface of a plastic or cardboard container, preferably a cup with about 6 to 8 ounce capacity. The core material made from formulation B is used to fill the remaining space in the plastic or cardboard container lined with the chocolate fudge coating. A top layer of chocolate fudge coating is applied to cover the exposed core to a thickness of about one quarter of an inch. A lid is attached to the container and the contents of the container are frozen at a temperature of at least −10° F. The container holding the frozen edible comestible of the invention is transferred to a tempering cabinet at a temperature of at least −10° F. From the tempering cabinet, the container is transferred to the microwave oven and the contents are subjected to microwave energy on the "high" setting for about 30 seconds. The result is an edible comestible comprising a substantially frozen core of ice cream with normal texture surrounded by the coating that has melted, softened and become slightly warm.

EXAMPLE II

The same procedures of Example I are followed using a core made from formulation B and using a coating made from caramel fudge. The results obtained are the same as Example I.

EXAMPLE III

The same procedures of Example I are followed using a core made from formulation A and using a coating made from cherries jubilee topping. The results obtained are the same as Example I.

EXAMPLE IV

The same procedures of Example I are followed using a core material made from formulation D and using a coating made from marshmallow topping. The results obtained are the same as Example I.

EXAMPLE V

The same procedures of Example I are followed using a core material made from formulation C and using a coating made from strawberry topping. The results obtained are the same as Example I.

EXAMPLE VI

The same procedures of Example I are followed except that the time the contents of the cup are subjected to microwave energy is decreased to about 20 seconds. The core material used is made from formulation E and the coating used is made from chocolate fudge. The results obtained are the same as Example I.

EXAMPLE VII

The same procedures of Example I are followed using a core made from formulation G and using a coating made from chocolate fudge. The results obtained are the same as Example I.

EXAMPLE VIII

The same procedures of Example I are followed using a core made from formulation G and using a coating made from caramel fudge. The results obtained are the same as Example I.

EXAMPLE IX

The same procedures of Example I are followed using a core made from formulation H and using a coating made from chocolate fudge. The results obtained are the same as Example I.

EXAMPLE X

The same procedures of Example I are followed using a core made from formulation H and using a coating made from caramel fudge. The results obtained are the same as Example I.

EXAMPLE XI

The same procedures of Example I are followed using a core made from formulation H and using a coating made from cherries jubilee topping. The results obtained are the same as Example I.

What is claimed is:

1. A sundae-type frozen dessert product comprising:
    a cup-shaped storage and serving container made of a material that is substantially transparent to microwave heating energy;
    a frozen sundae-type topping completely lining the inside of the container to a thickness of between about one quarter inch and about one half inch; and
    a frozen core of a flavored dessert composition disposed within and contiguous to the lining of sundae-type topping, the topping also covering the top of the core so that the core is completely enclosed by a coating of topping of between about one quarter inch and one half inch in thickness,
    the density and solids content of the topping being preselected relative to the density and solids content of the dessert composition such that when the container of the frozen product is subjected to microwave heating energy of a predetermined power and duration, the coating will be softened without melting the core.

2. The sundae-type frozen dessert product of claim 1 wherein the sundae-type topping is selected from the group consisting of chocolate fudge, caramel fudge, strawberry topping, marshmallow topping, and cherries jubilee topping.

3. The sundae-type frozen dessert product of claim 1 wherein the frozen dessert composition of the core is selected from the group consisting of ice cream, custard, ice milk, yogurt, flavored ices, puddings, and combinations thereof.

4. The sundae-type frozen dessert product of claim 1 wherein the density of the topping is greater than the density of the core composition.

5. The sundae-type frozen dessert product of claim 1 wherein the frozen dessert composition of the core is a medium to high density ice cream having a density in the range of about 6.3 pounds per gallon to about 7.6 pounds per gallon.

6. A process for preparing a sundae-type frozen dessert product in a storage and serving container made of a material that is substantially transparent to microwave heating energy, the process comprising the steps of:

(a) lining the inside surface of the container with a sundae-type topping to a thickness of between about one quarter inch and about one half inch;
(b) filling the remaining space in the lined container with a flavored dessert composition core;
(c) applying a top layer of the sundae-type topping to cover the exposed surface of the core to a thickness of between about one quarter inch and about one half inch, such that the core is completely surrounded by a coating of the topping; and
(d) placing the filled container in a frigid environment for sufficient time to freeze the core and the coating, the density and solids content of the topping being preselected relative to the density and solids content of the dessert composition such that when the container of the frozen product is subjected to microwave heating energy of a predetermined power and duration, the coating will be softened without melting the core.

* * * * *